Feb. 14, 1956 A. W. EDWARDS ET AL 2,734,964

CIRCUIT INTERRUPTERS

Filed Dec. 14, 1951 4 Sheets-Sheet 1

WITNESSES:

E. A. McCloskey

W. R. Crout

INVENTORS
Andrew W. Edwards
and William J. Paxton.
BY
Ralph H Swingle
ATTORNEY

Feb. 14, 1956 A. W. EDWARDS ET AL 2,734,964

CIRCUIT INTERRUPTERS

Filed Dec. 14, 1951 4 Sheets-Sheet 2

WITNESSES:
E. A. McCloskey
W. R. Crout

INVENTORS
Andrew W. Edwards
and William J. Paxton.
BY
Ralph H. Swingle
ATTORNEY

WITNESSES:
E. A. McElroskey
W. R. Crout

INVENTORS
Andrew W. Edwards
and William J. Paxton.
BY
Ralph H. Swingle
ATTORNEY

WITNESSES:
E. A. McCloskey
W. R. Crout

INVENTORS
Andrew W. Edwards
and William J. Paxton.
BY
Ralph H. Swingle
ATTORNEY

United States Patent Office 2,734,964

Patented Feb. 14, 1956

2,734,964

CIRCUIT INTERRUPTERS

Andrew W. Edwards, East McKeesport, and William J. Paxton, Pittsburgh, Pa., assignors to Westinghouse Electric Corporation, East Pittsburgh, Pa., a corporation of Pennsylvania Application December 14, 1951, Serial No. 261,686

4 Claims. (Cl. 200—114)

This invention relates generally to circuit interrupters, and, more particularly, to circuit-interrupting devices having a pivotally-mounted switch element or fuse tube.

A general object of our invention is to provide an improved pivotally-mounted circuit interrupting device having few and simple parts, and which is of generally rugged and sturdy construction.

Another object is to provide an improved circuit-interrupting device of the pivoted switch-blade type in which improved shielding means are provided to protect the operating elements from the effects of weather.

Still a further object of our invention is to provide an improved circuit-interrupting device of the pivoted switch-element type in which the contact construction is improved so as to render the device suitable for carrying large currents without the several portions therof heating up.

Another object is to provide an improved circuit interrupting device of the type set forth in the immediately preceding paragraph in which improved shielding means are provided to protect the contact-bearing portions from the effects of weather.

Still another object is to provide an improved latching arrangement for a circuit interrupting device of the type having a pivoted switch element or fuse tube.

Another object is to provide an improved open-type of dropout fuse in which the toggle elements thereof are of more simple construction and more effective in operation than heretofore provided.

A further object is to provide an improved and simplified contact construction in which novel means are associated with the terminal bolts to prevent the rotation thereof.

Further objects and advantages will readily become apparent upon reading the following specification, taken in conjunction with the drawings, in which.

Figure 1:
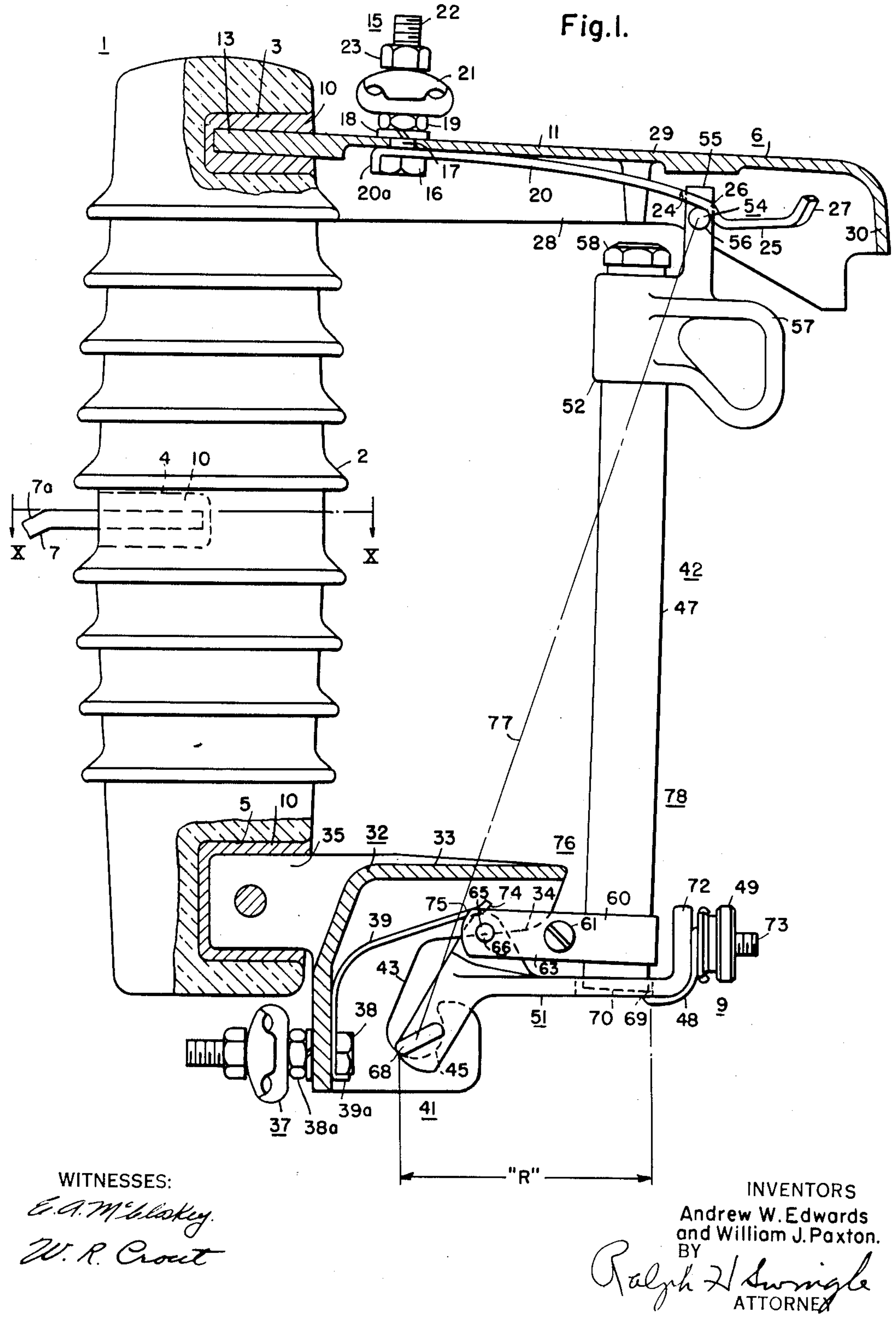
Figure 1 is a side elevational view, partially in vertical section, of a circuit interrupting device embodying the features of our invention and shown in the closed-circuit position.

Referring to the drawings, and more particularly to Fig. 1 thereof, the reference numeral 1 generally designates a circuit interrupting device having a pivoted switch element or fuse tube. The circuit interrupting device 1 is mounted by means of an insulator 2, which may be of porcelain, or other suitable insulating material having the requisite mechanical properties. As shown, the supporting insulator 2 has a plurality of recesses formed therein, as indicated at 3, 4, 5, which serve to support an upper stationary contact assembly 6, a mounting bracket 7 and a lower stationary contact assembly 9.

Preferably, minerallead 10 is poured into the recesses 3–5, after the mounting projections of the contact assemblies 6, 9 and the mounting bracket 7 are placed therein. The minerallead, when cooled, rigidly secures the contact assemblies 6, 9 and the mounting bracket 7 securely into position.

As well known by those skilled in the art, the supporting insulator 2 is secured by the mounting bracket 7 to the cross-arm of a transformer pole, although it can, of course, be mounted upon any supporting structure. Preferably, the insulator is inclined somewhat, or tilted, to facilitate the dropout action, hereinafter referred to, a bend *7a* of the mounting bracket 7 being provided for this purpose. For purposes of illustration, however, the supporting insulator 2 is shown in a vertical position in the drawings.

The upper stationary contact assembly 6 includes a U-shaped channel member 11, which forms a sleet hood for contact structure hereinafter referred to. The channel member 11 is preferably formed as a single casting having a mounting extension 13 (Fig. 1) which projects into the recess 3 of the supporting insulator 2. A terminal-line clamp 15 is provided including a terminal bolt 16 which passes through an aperture 17 provided in the sleet hood 11 and having a lock-washer 18 and nut 19 tightened thereon to fixedly hold the terminal line clamp 15 fixedly in position. Also, the terminal bolt 16 extends through a flexible contact plate or contact finger 20 and rigidly holds the latter in position within the sleet hood 11. The attached end of the plate 20 is turned as at 20*a*, to bear against the head of the terminal bolt 16 to prevent rotation of the same should the nut 19 become loosened. At the upper end of the line-terminal clamp 15 are a pair of cooperating metallic grippers 21 surrounding the shank portion 22 of the terminal bolt 16, and a clamping nut 23 is provided to clamp the grippers 21 about one or more line conductors, not shown.

The contact plate 20 is split, as at 24, adjacent the outer free end thereof to form two flexible latching contacts 25. Each latching contact 25 has a detent portion 26 (Fig. 1) and a guide portion 27, the purpose for which will become more apparent hereinafter.

Figure 2:
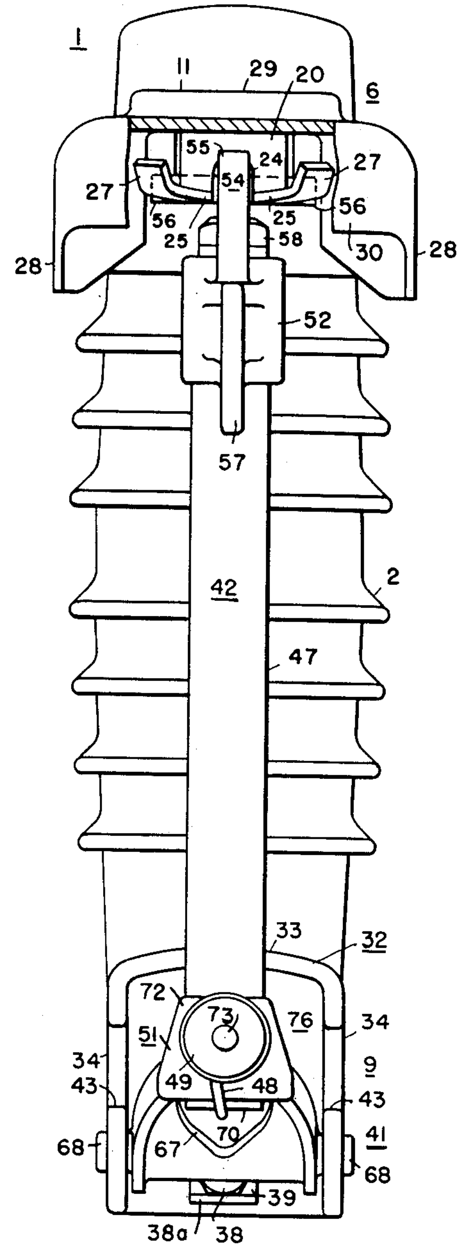
Fig. 2 is an end elevation view of the circuit interrupting device illustrated in Fig. 1.

As shown in Figs. 1 and 2 of the drawings, the U-shaped channel member 11 provides a pair of wall portions 28, a top wall portion 29 and an end wall portion 30. These wall portions 28, 29 and 30 serve to enclose the upper stationary contact assembly 6.

The lower stationary contact assembly 9 includes a casting 32 having a top wall portion 33 and side wall portions 34. The casting 32 has an integrally-formed mounting extension 35 (Fig. 1) which projects within the recess 5 and is fixedly secured therein by the mineral lead 10. A lower line-terminal clamp 37 is secured to the casting 32. The line-terminal clamp 37 includes a terminal bolt 38, which is of similar construction to the terminal bolt 16 hereinbefore described, and consequently will not be further described. The terminal bolt 38 also passes through a lower leaf-spring contact or contact finger 39, which has an end 39*a* turned against the head of the terminal bolt 38 to prevent rotation of the same, should the nut 38*a* become loosened. It will be noted that the lower leaf-spring contact 39 is substantially enclosed and protected from the effects of weather by the wall portions 33—34 of the casting 32.

The lower stationary contact assembly 9 also includes a hinge pivot 41 for pivotally mounting a movable switch blade means or fuse holder, generally designated by the reference character 42. The hinge pivot 41 includes trunnion-guide slots 43 formed in the side walls 34 of the lower casting 32. The trunnion-guide slots 43 lead into offset trunnion bearings or seats 45 (Fig. 1) which are spaced apart and horizontally aligned.

In this particular instance, the pivotally-mounted switch element or fuse tube 42 assumes the form of a dropout type fusible device. As shown in the drawings, the fusible device 42 includes a fuse tube 47 formed of any suitable insulating material, such as fiber which encloses a fuse link, not shown. The fuse link has a fuse-link cable extension 48 which is clamped by a thumb screw 49 to a toggle-link hinge member 51. The fuse link may include a fusible strip which is paralleled by a fusible strain member, as well known in the art.

Figure 3:
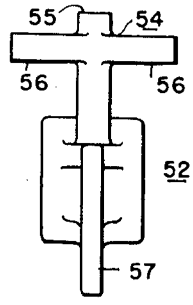
Fig. 3 is an end elevational view of the upper terminal assembly of our improved interrupting device.

At the upper end of the fuse tube 47 is a metallic terminal ferrule 52 providing a hook-eye and latch fixture. The terminal ferrule 52, as more clearly shown in Figs. 1 and 3, includes a T-shaped contact latching portion 54 having an upper integrally formed guide tip 55. The guide tip 55 passes between the spaced-apart latching contacts 25 until the rod-shaped movable contacts 56 (Fig. 3) pass under the detent portions 26 of the latching contacts 25, and are latched thereby, as shown in Fig. 1.

The upper terminal assembly 52 also includes an integrally formed operating ring 57, which may be engaged by a hook-stick so that the switch element 42 may be manually opened and closed from a point remote therefrom. The upper terminal assembly 52 also includes a threaded cap 58 which clamps the top of the fuse link within the fuse tube 47. Thus to replace the fuse link, it is merely necessary to unscrew the threaded cap 58, remove the upper end of the ruptured fuse link, and insert a new fuse link downwardly through the fuse tube 47. Then the cap 58 is again threadedly secured to the upper terminal assembly 52, thereby clamping the upper end of the fuse link fixedly in position. As mentioned, the lower end of the fuse link, not shown, is provided by the cable extension 48, which is clamped to the toggle-link hinge member 51 by the thumb screw 49.

As shown, the lower end of the fuse tube 47 is open to accommodate the passage therethrough of the cable extension 48. A clamping collar 60, more clearly shown in Fig. 8, encircles the lower end of the fuse tube 47 and is clamped rigidly thereto by a clamping bolt 61 (Fig. 1) which passes through apertures 62 formed in leg portions 63 of the collar 60. A nut, not shown, is threadedly secured to the other end of the clamping bolt 61, and is drawn up thereon so that the clamping collar 60 is rigidly fastened to the fuse tube 47.

Figure 4:
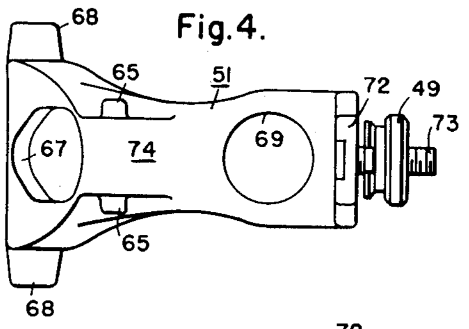
Fig. 4 is a plan view of the toggle-link hinge member utilized in our improved construction.
Figure 8:
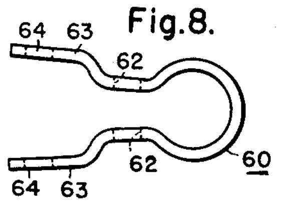
Fig. 8 is a plan view of the clamping collar which surrounds the fuse tube of our improved circuit interrupting device.
Figure 9:
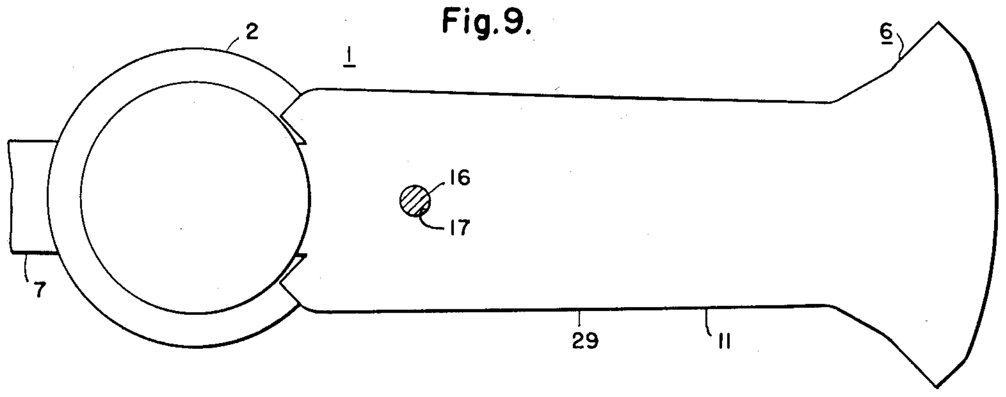
Fig. 9 is a top plan view of our improved interrupting device with the top terminal line clamp omitted.
Figure 10:
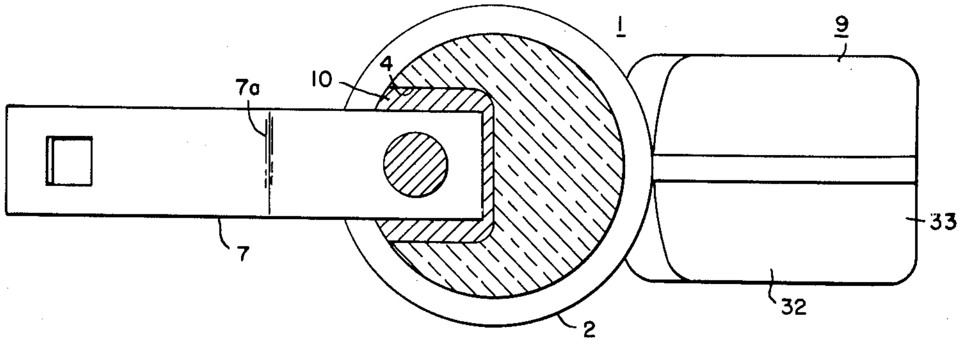
Fig. 10 is a sectional view taken through the device along the line X—X of Fig. 1 with the fuse holder omitted.

As shown in Fig. 8, at the extremities of the legs 63 of the clamping collar 60 are apertures 64 which pass over trunnions 65 integrally formed on the toggle-link hinge member 51, as more clearly shown in Fig. 4 of the drawings. Thus, the trunnions or stub shafts 65 passing through the apertures 64 of clamping collar 60 provide a pivotal connection 66 between the fuse tube 47 and the toggle-link hinge member 51.

Figure 5:
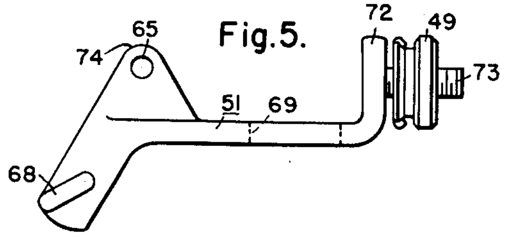
Fig. 5 is a side elevational view of the toggle-link hinge member illustrated in Fig. 4.

Preferably, the toggle-link hinge member 51 is a casting (Figs. 4 and 5) providing an eyelet 67 and a pair of trunnions or stub shafts 68, the latter seating within the trunnion bearings 45 of the lower stationary contact assembly 9. Also, the toggle-link hinge member 51 has an aperture 69 provided therein to accommodate the lower extremity 70 of the fuse tube 47, when the fuse holder 42, including the metallic ferrule 52, the fuse tube 47 and the toggle-link hinge member 51, is in the stiff-leg position, as shown in Fig. 1 of the drawings.

The right-hand end of the toggle-link hinge member 51, as viewed in Fig. 1, extends upwardly, as at 72, to form a fuse terminal, to which the cable extension 48 may be manually secured by means of the thumb screw 49, which threads upon a stud 73 secured to the upstanding portion 72 of the member 51 by any suitable means. Also, the toggle-link hinge member 51 has a contact portion 74 (Fig. 4) against which the right-hand end 75 of the lower leaf-spring contact 39 bears in the closed circuit position of the device, as shown in Fig. 1.

Figure 6:
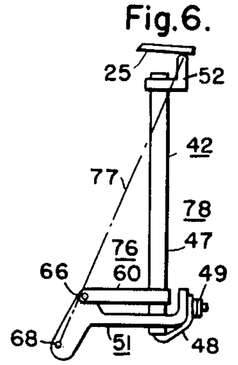
Fig. 6 is a somewhat diagrammatic view illustrating the principle of the dropout operation of our improved device, the contact structure being diagrammatically illustrated in the closed circuit position.
Figure 7:
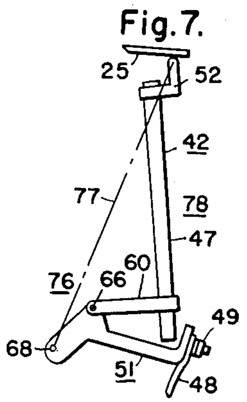
Fig. 7 is a diagrammatic view similar to that represented in Fig. 6, but showing the position of the several parts upon rupture of the fuse link and at the beginning of the dropout operation.

In effect, the clamping collar 60 and the fuse tube 47, rigidly secured thereto, form a toggle-link, generally designated by the reference character 78, which cooperates with the toggle-link hinge member 51. With the parts in the position shown in Fig. 1, the resulting toggle 76 is extended, with the pivotal connection 66 coming close to, but not on, center position. Thus, the line of action of the force exerted by the contact blade 20 extends between the hinge pivot 41 and the contacts 56. A line of action 77 is indicated which tends to break or collapse the toggle 76, as indicated in Fig. 6 of the drawings. However, the toggle 76 is prevented from being broken by the tension exerted along the cable extension 48. When the fuse link, disposed interiorly within the fuse tube 47, fuses upon an overload existing in the protected circuit, the toggle 76 will collapse, as indicated in Fig. 7, and the fuse tube 47, together with the upper terminal assembly 52, will drop vertically downwardly, to disengage the contacts 56 from the detent portions 26 of the latching fingers 25. The weight of the fuse holder 42, in addition to the biasing action exerted by the end 75 of the leaf-spring contact 39, will cause the fuse holder 42 to pivot in a clockwise direction about the hinge pivot 41. Thus, the fuse holder 42 will swing completely about the pivot 41, so that it will hang downwardly, thereby inserting a wide disconnecting air gap between the upper and lower stationary contact assemblies 6, 9 supported by the porcelain insulator 2.

An attendant may then engage the hook portion of a hook-stick within the eyelet 67 of the toggle-link hinge member 51, and may move the holder 42 upwardly to disengage the trunnions 68 from the trunnion seats 45. It will be observed that in this position of the fuse holder 42 the narrow sides of the trunnions 68 are presented to the trunnion-guiding slots 43. In the 90° dropout position, it will be apparent that the flat faces of the trunnions 68 will be presented to the guiding slots 43, and removal of the fuse holder 42 from the guiding slots 43 would not be possible in such 90° dropout position. It is only when the fuse holder 42 has dropped substantially 180° that the narrow sides of the trunnions 68 may be withdrawn from the trunnion seats 45.

The attendant may refuse the fuse holder 42 in the manner indicated heretofore, and by inserting the hook or prong of the hook-stick within the eyelet 67 of the hinge member 51 may reinsert the trunnions 68 within the trunnion seats 45, this being readily accomplished in the 180° dropout position. The attendant may then move the prong of the hook-stick from the eyelet 67, and may insert the prong of the hook-stick within the operating ring 57, and swing the entire fuse holder 42 in a counterclockwise direction about the pivot 41, as viewed in Fig. 1, until the movable contacts 56 are again relatched beneath the detent portions 26 of latching contact fingers 25. The electrical circuit is, of course, then completed through the device.

It will be apparent that the switch blade 42 may be manually operated as an ordinary disconnecting switch. Thus, one may insert the prong of a switch-stick in the operating ring 57 and forceably unlatch the contact ferrule 52 from the contact fingers 25. The switch blade 42 may then be easily moved to the 180° open position. To close the device the reverse operation may be made.

Attention is directed to the fact that by securing the cable 48 to the outer free end of the toggle-link hinge member 51, the torque arm "R" (Fig. 1) is increased over the constructions used heretofore, thereby reducing the strain on the fuse link for a given compressive force exerted along the line of action 77. Also the thumb screw 49 is easily accessible and does not strike the contact assembly 9 on the opening dropout stroke. Moreover, by increasing the torque arm "R" a greater speed of removal of the ruptured fuse link is insured upon blowing of the fuse and subsequent collapse of the toggle.

From the foregoing, it will be apparent that we have provided an improved circuit interrupting device of the pivoted-switch element type in which not only improved shielding means are provided to protect the contact portions from the effects of weather, but also the several portions are simple in construction, effective in operation, and are rugged in design. It will also be apparent that a direct electrical path is provided through the terminal bolt 16 along the contact plate 20 through the fuse link and cable extension 48 to the hinge member 51, and thence through the contact portion 74 of the latter to the contact finger 39 directly to the terminal bolt 38. Thus, the device is particularly adapted for carrying large amounts of current in the direct electrical path therethrough providing a minimum of heating of the several parts.

By having the upper and lower stationary contact assemblies 6, 9 formed of castings, a rugged construction is provided and the device is particularly adapted for rough handling.

Figs. 11–14 illustrate a modified type of lower stationary contact assembly, which may be substituted for the lower stationary contact assembly 9 illustrated in Figs. 1 and 2 previously described. It will be noted that in the modified construction set out in Fig. 11, a modified type of toggle-link hinge member 80 is employed, which is more clearly illustrated in Figs. 12 and 13 of the drawings.

Figure 12:
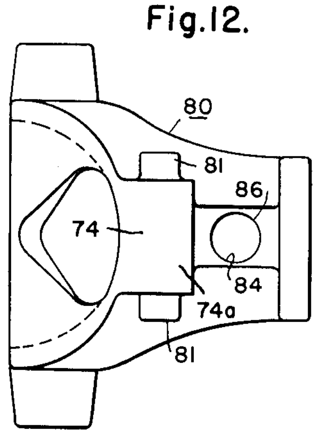
Fig. 12 is an enlarged plan view of the toggle-link hinge member utilized in the modified type of contact construction shown in Fig. 11.
Figure 13:
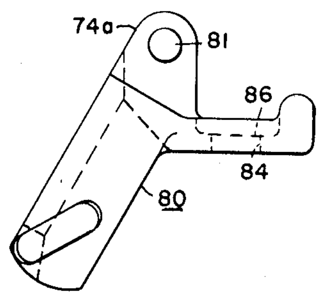
Fig. 13 is a side elevation view of the modified type of toggle-link hinge member illustrated in Fig. 12.

Referring to Figs. 12 and 13, it will be observed that the modified type of toggle-link hinge member 80 has trunnions 81, which cooperate with apertures 82 provided in a clamping collar 83, similar to the clamping collar 60 heretofore described. The clamping collar 83 is again fixedly secured to the lower end of the fuse tube 47 by a clamping bolt 61.

To prevent relative movement between the clamping collar 83 and the fuse tube 47 after repeated interruptions of heavy current during high stress conditions, a short pin 91 is provided (Fig. 14), which loosely passes through an aperture 92 of the collar 83. The pin 91 also loosely fits within a recess 93 disposed at the lower end of the fuse tube 47.

To prevent detachment of the loose-fitting pin 91, a name plate 94 is employed, which encircles the collar 83 and is secured into position by the clamping bolt 61. If desired, a corner 95 (Fig. 14) of one end of the name plate 94 is bent over against the nut 96 of the bolt 61 to prevent loosening rotation of the latter under vibration.

Figures 11, 14:
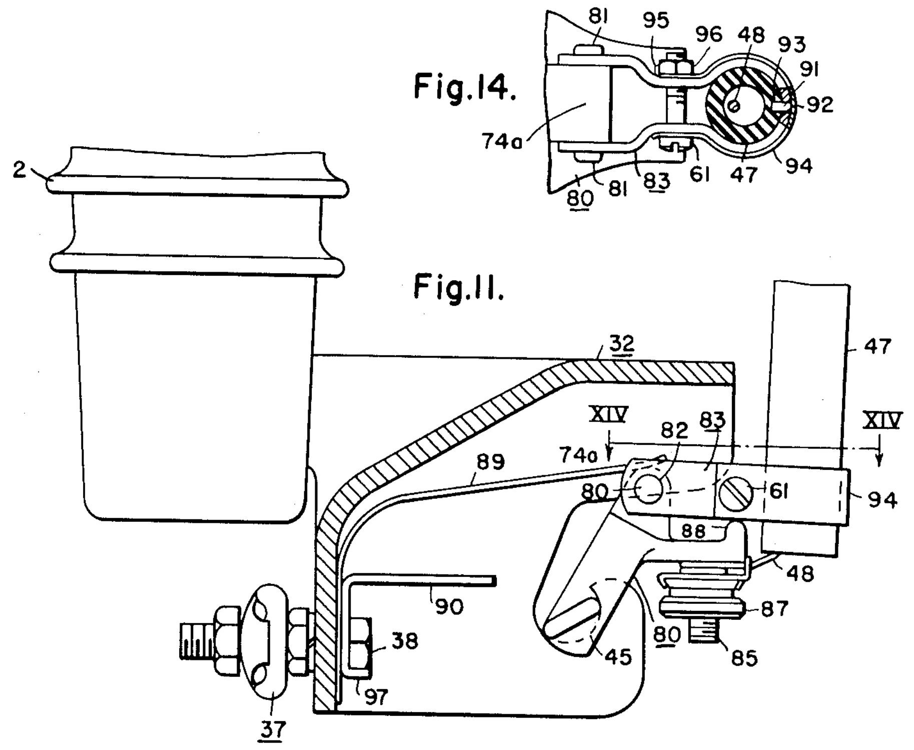
Fig. 11 is a fragmentary vertical, sectional view through a modified type of lower contact assembly, which may be substituted for the lower contact assembly utilized in Figs. 1 and 2.
Fig. 14 is a fragmentary sectional view taken along the line XIV—XIV of Fig. 11.

The hinge member 80 has an aperture 84 provided therein, which is internally threaded, and which serves to accommodate a threaded stud 85, as shown in Fig. 11. Following threaded insertion of the stud bolt 85 within the aperture 84 of hinge member 80, the upper side 86 (Fig. 12) is a prick-punched to prevent rotation of the stud bolt 85. Thus, a thumb nut 87 may be employed to secure the lower cable 48 in tension upon the toggle-link hinge member 80 so as to maintain an upstanding lug portion 88 in engagement with the lower side of the clamping collar 83, as shown in Fig. 11. In this position, the toggle 76 is in its stiff-leg position, and may be inserted within the offset trunnion bearings 45 in the manner previously described.

Upon blowing of the fuse link, the toggle 76 will be collapsed, and the fuse tube 47 will drop downwardly and outwardly, being assisted in this action by a lower leaf-spring contact 89 bearing upon a contact portion 74*a* associated with the hinge member 80. Again, the leaf-spring contact 89 is secured to the casting 32 by a terminal bolt 38, which also serves to secure a resilient stop strap 90 in position, as shown in Fig. 11.

The stop strap 90 is disposed in the line of opening travel of the threaded stud 85 to arrest the opening travel of the fuse holder in a resilient manner, thereby cushioning the shock when the fuse holder opens.

It will be noted that the stop strap 90 has a right angle bend, as at 97, to bear against the side of the terminal bolt 38 to prevent the latter rotating. Thus, not only does the terminal bolt 38 provide a direct electrical connection to the contact strap 89, but also it secures the flexible stop 90 into position, with the further provision that a portion of the strap 90 prevents rotative movement of the terminal bolt 38.

Although we have shown and described two specific structures, it is to be clearly understood that the same were merely for the purpose of illustration, and that changes and modifications may readily be made therein by those skilled in the art without departing from the spirit and scope of the appended claims.

We claim as our invention:

1. A cutout of the dropout type including a pair of spaced contact assemblies, a fuse holder including a fuse tube and a toggle-link hinge member, the toggle-link hinge member being pivotally mounted upon one of the contact assemblies, means pivotally connecting the fuse tube on one side thereof to the toggle-link hinge member, the toggle-link hinge member having an aperture therein to accommodate one end of the fuse tube and having a substantially right-angle bend at its outer free end on the opposite side of the fuse tube, a fuse link having a flexible fuse link cable extending out of said one end of the fuse tube, and means for securing the cable to the toggle-link hinge member adjacent the opposite side of the fuse tube at the free end thereof to increase the torque arm distance exerted by the fuse link in maintaining the toggle-link hinge member in its stiff leg position.

2. A circuit interrupter including a pair of spaced contact assemblies, movable switch blade means pivotally mounted upon one contact assembly and electrically interconnecting the spaced contact assemblies in the closed circuit position, one of the contact assemblies including a sleet hood, a contact finger, a terminal bolt securing the contact finger to the sleet hood adjacent one end thereof, and said one end of the contact finger being turned to bear against the head of the terminal bolt to prevent rotation of the latter.

3. A circuit interrupter including a pair of spaced contact assemblies, movable switch blade means pivotally mounted upon one contact assembly and electrically interconnecting the spaced contact assemblies in the closed-circuit position, a contact finger, a terminal bolt securing the contact finger to said one contact assembly, the contact finger making electrical contact at least in the closed-circuit position with a portion of the switch blade means, and one end of the contact finger being turned to bear against the head of the terminal bolt to prevent rotation of the latter.

4. A circuit interrupter including a pair of spaced contact assemblies, movable switch blade means pivotally mounted upon one contact assembly and electrically interconnecting the spaced contact assemblies in the closed-circuit position, one of the contact assemblies including a sleet hood, a contact finger, a resilient stop strap, a terminal bolt for securing the contact finger and the stop strap to the sleet hood, and one end of the stop strap being turned against the head of the terminal bolt to prevent rotation of the latter.

References Cited in the file of this patent

UNITED STATES PATENTS

| | | |
|---|---|---|
| 1,233,197 | Cuthbert | July 10, 1917 |
| 1,779,502 | Steinmayer | Oct. 28, 1930 |
| 2,068,510 | Pittman | Jan. 19, 1937 |
| 2,324,114 | Schultz et al. | July 13, 1943 |
| 2,347,641 | Ramsey | May 2, 1944 |
| 2,404,230 | Harlow et al. | July 16, 1946 |
| 2,409,077 | Steinmayer | Oct. 8, 1946 |
| 2,459,691 | Earle et al. | Jan. 18, 1949 |
| 2,471,177 | Von Hoorn | May 24, 1949 |
| 2,493,432 | Yonkers | Jan. 3, 1950 |
| 2,550,444 | Bennett et al. | Apr. 24, 1951 |
| 2,574,401 | Lesher | Nov. 6, 1951 |
| 2,581,954 | Hubbard et al. | Jan. 8, 1952 |
| 2,689,284 | Hill | Sept. 14, 1954 |